US007879458B2

(12) United States Patent
Greenlee

(10) Patent No.: US 7,879,458 B2
(45) Date of Patent: Feb. 1, 2011

(54) CONSTRUCTION HARDWARE AND METHOD OF REDUCING CORROSION THEREOF

(75) Inventor: Greg T. Greenlee, Savage, MN (US)

(73) Assignee: United Steel Products Company, Montgomery, MN (US)

( * ) Notice: Subject to any disclaimer, the term of this patent is extended or adjusted under 35 U.S.C. 154(b) by 0 days.

(21) Appl. No.: 12/825,456

(22) Filed: Jun. 29, 2010

(65) Prior Publication Data

US 2010/0261035 A1 Oct. 14, 2010

Related U.S. Application Data

(63) Continuation of application No. 11/613,558, filed on Dec. 20, 2006, now abandoned.

(60) Provisional application No. 60/752,570, filed on Dec. 21, 2005.

(51) Int. Cl.
*B32B 15/18* (2006.01)
*B32B 15/04* (2006.01)

(52) U.S. Cl. ........................ 428/659; 428/624; 428/332; 428/215

(58) Field of Classification Search ........................ None
See application file for complete search history.

(56) References Cited

U.S. PATENT DOCUMENTS

| | | | |
|---|---|---|---|
| 4,798,772 | A | 1/1989 | Furukawa |
| 5,384,165 | A | 1/1995 | Sellitto |
| 7,083,831 | B1 | 8/2006 | Koch et al. |
| 2006/0100112 | A1 | 5/2006 | Wormuth et al. |

FOREIGN PATENT DOCUMENTS

| | | |
|---|---|---|
| WO | WO 00/69978 | 11/2000 |
| WO | WO 2004/050808 | 6/2004 |

OTHER PUBLICATIONS

Henkel Surface Technologies, *Material Safety Data Sheet* (*re: BONDERITE® 1421-A Makeup*), I.D. # 237139, Revision: 1.0202, Oct. 20, 2006, 8 pp.

Henkel, *Technical Process Bulletin* (*re: BONDERITE® 1421-A*), I.D. # 237139, Oct. 5, 2000, 7 pp.

Henkel Surface Technologies, *Material Safety Data Sheet* (*re: BONDERITE® 1455-SF*) I.D. # 237043, Revision: 1.0001, Jun. 29, 2001, 5 pp.

Henkel, *Technical Process Bulletin* (*re: BONDERITE® 1455 SF*), I.D. # 237043, Aug. 27, 2002, 5 pp.

Henkel Surface Technologies, *Material Safety Data Sheet* (*re: DRAWCO DFL 767*), I.D. # 237913, Revision: 1.0003, Jul. 20, 2005, 5 pp.

(Continued)

*Primary Examiner*—Aaron Austin
(74) *Attorney, Agent, or Firm*—Brett A. Klein; Dorsey & Whitney LLP

(57) ABSTRACT

A method of reducing corrosion in an article of construction hardware resulting from exposure to ACQ treated lumber and an article of construction hardware treated in accordance with such method.

7 Claims, 1 Drawing Sheet

OTHER PUBLICATIONS

Henkel Technologies, *Material Safety Data Sheet* (*re:*

Henkel, *Technical Process Bulletin* (*re: DRAWCO DFL 767*) I.D. # 237913, Revision: Nov. 10, 2005, 3 pp. BONDERITE® 1402W) I.D. # 235499, Revision: 1.0334, Jul. 26, 2006, 6 pp.

Henkel, *Technical Process Bulletin* (*re: BONDERITE® 1402W*) I.D. # 235499, Revision: Oct. 4, 2004, 6 pp.

Henkel Surface Technologies, *Material Safety Data Sheet* (*re: BONDERITE® 1303 Makeup*) I.D. # 230578, Revision: 1.0013, Nov. 3, 2006, 6 pp.

Henkel, *Technical Process Bulletin* (*re: BONDERITE® 1303 Process*) I.D. # 230578, Revision: Jun. 12, 2006, 7 pp.

Magni Industries, Inc., *Technical Data Sheet* (re: *L94*), Formed No. 4.04.04.02.01, Revision Jan. 14, 2003, Printed Jul. 8, 2005, 1 p.

Magni Industries, Inc., *Material Safety Data Sheet* (re: L94), Prepared Jul. 6, 2005, Issued Jul. 8, 2005, 6 pp.

CONSTRUCTION HARDWARE AND METHOD OF REDUCING CORROSION THEREOF

CROSS-REFERENCE TO RELATED APPLICATIONS

The present application is a continuation of U.S. Non-Provisional patent application Ser. No. 11/613,558 filed on Dec. 20, 2006, now abandoned entitled "Construction Hardware and Method of Reducing Corrosion Thereof," which application claims priority to U.S. Provisional Application No. 60/752,570 filed on Dec. 21, 2005, entitled "Construction Hardware and Method of Reducing Corrosion Thereof," the contents of each of which are hereby incorporated by reference herein in their entireties.

BACKGROUND OF THE INVENTION

1. Field of the Invention

The present invention relates generally to construction hardware and a method for reducing the corrosion thereof. More specifically, the present invention relates to construction hardware and the like which have been manufactured from coil steel and a method of applying a coating thereto for reducing corrosion resulting from reaction with chemicals in chemically treated wood.

2. Description of the Prior Art

Construction hardware as used herein refers to various hangers, connectors, straps, tiedowns and the like which are used in the construction industry to connect wooden structural members to one another. Such construction hardware is commonly manufactured from rolls of coil steel. Many applications of such construction hardware are for use in connection with wooden structural members comprised of lumber treated with chemical preservatives (so called "treated lumber").

Treated lumber is commonly used in outdoor structures exposed to moisture and the environment to reduce deterioration of the lumber. Until a couple of years ago, the most common chemical preservative used for this purpose was a combination of chromium, copper and arsenic, namely chromated-copper-arsentate. This chemical preservative was commonly referred to as "CCA". For protection against atmospheric and other possible forms of corrosion, it was common throughout the industry to provide construction hardware with a protective coating of zinc or a zinc alloy. Initially, such zinc coating was applied at a thickness of G60 (0.6 oz. per square foot). More recently, to comply with various foreign standards, the zinc coating has been applied at a thickness of G90 (0.9 oz. per square foot). Thus, a G90 coating of zinc was believed to be a sufficient corrosion protector for construction hardware used with CCA treated lumber.

In part, due to the presence of arsenic in the CCA preservative, the wood treatment industry recently made a voluntary decision to eliminate arsenic from the preservative and thus moved away from CCA. The most widely recognized replacement wood preservative is a water based wood preservative commonly referred to as ACQ comprising a combination of copper oxide and a quaternary ammonium compound. While treatment of construction hardware with zinc at a thickness of G90 sufficiently protected CCA coated hardware from atmospheric and other various other forms of corrosion, most test results suggested that ACQ treated lumber added a further form of corrosion to construction hardware via a dissimilar metal reaction between the copper and the zinc. The industry response to this increased corrosiveness was to provide construction hardware with a thicker layer of zinc, namely, G185 (1.85 oz. per square foot). While this increased thickness of zinc functioned to extend the usable life of a piece of construction hardware from the destructive corrosion of ACQ, the thicker zinc coating was still available to react with the copper in the ACQ treated lumber via a dissimilar metal reaction. Thus, increasing the zinc protective layer on the construction hardware still involved a solution comprised of a sacrificial coating material. This necessarily resulted in a limited, but undetermined, useful product life.

Accordingly, there is a need in the art for construction hardware with alternate corrosion reducing properties and alternate methods of reducing corrosion between construction hardware and preservative treated lumber and particularly between construction hardware and ACQ treated lumber.

SUMMARY OF THE INVENTION

It is known that the underlying steel of zinc coated construction hardware is protected against corrosion resulting from exposure to lumber treated with CCA by the zinc coating. The zinc coating is commonly at a thickness of G60 or G90. Because lumber treated with ACQ is considered to be more corrosive, the current process is to provide a thicker layer of zinc as corrosion protection. However, ACQ contains unprotected copper which will react with the zinc in the zinc coated hardware via a dissimilar metal reaction. Thus, the protection of construction hardware against corrosion in ACQ treated lumber by zinc alone, even thicker layers of zinc, is still a sacrificial protective process which will last only as long as the zinc remains unreacted with the ACQ copper. Therefore, although thicker layers of zinc will provide longer protection against such corrosion, even the thicker layers of zinc will ultimately be consumed and corrosion of the underlying steel will occur.

In accordance with the present invention, the surface of zinc coated construction hardware is isolated from the environment, mainly water and moisture, thereby minimizing the dissimilar metal reaction between the zinc in the zinc coated hardware and the copper in the ACQ treated lumber. More specifically, by applying a moisture barrier coating to a zinc coated construction hardware member, reaction between the zinc and the copper is minimized, thereby prolonging the life of the hardware without increasing the thickness of the zinc.

Accordingly, an object of the present invention is to provide a method of protecting construction hardware against corrosion by ACQ treated lumber.

Another object of the present invention is to provide a method for reducing corrosion of construction hardware to ACQ treated lumber without increasing the protective zinc coating.

A still further object of the present invention is to provide an article of construction hardware with a coating to protect against corrosion by ACQ treated lumber.

These and other objects of the present invention will become apparent with reference to the drawing, the description of the preferred embodiment and method and the appended claims.

DESCRIPTION OF THE PREFERRED EMBODIMENT AND METHOD

Figure 1:
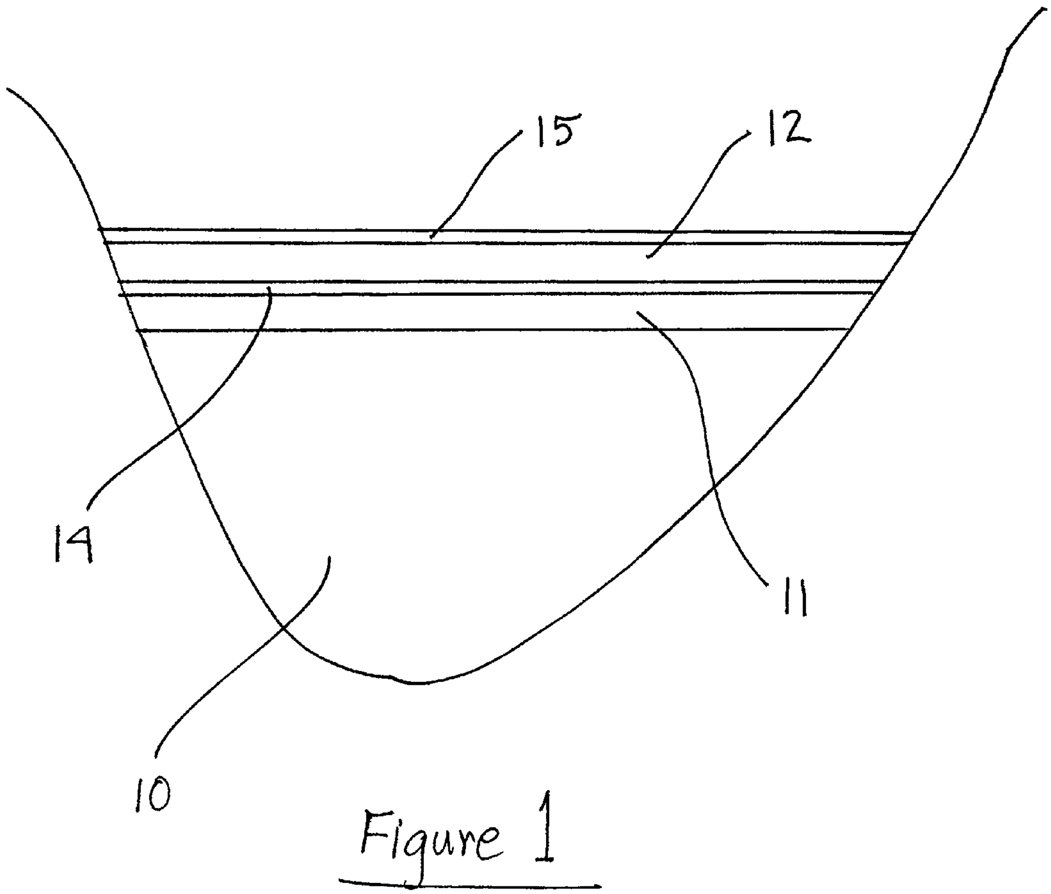
FIG. 1 is a sectional view of a portion of an article of construction hardware showing the protective zinc and moisture barrier coatings, among others.

The present invention relates generally to an article of construction hardware provided with a coating to protect it against corrosion by ACQ treated lumber and a method for protecting an article of construction hardware from such corrosion.

As a result of the wood preservative treatment industry moving away from arsenic containing CCA treatment to the safer ACQ treatment, increased corrosion problems in construction hardware exposed to ACQ treated lumber has occurred. Specifically, conventional zinc coatings of G60 and G90 thickness no longer provide sufficient corrosion protection. Accordingly, zinc coating thicknesses of G185 are being used. However, even these thicknesses are ultimately subject to degradation, and thus lack long term protective capability.

In accordance with the preferred method of the present invention, galvanized or zinc coated coil steel which has been coated on both sides is provided in roll form. Preferably, this is zinc coated steel with a zinc thickness of at least G60, more preferably G90. This steel is commonly "chemically treated dry" to protect the coil of steel by passivating the galvanization, or by reducing the chemical reactivity of the surface. However, because the specific moisture barrier coating of the preferred embodiment as discussed below does not adhere as well to passivated material, it is preferred that the galvanized steel be treated with light oil rather than being "chemically treated dry".

In general, the present invention involves applying a moisture barrier coating or paint to both sides of zinc coated construction hardware, or to both sides of the roll material from which such hardware is made. This forms a substantially water/moisture barrier between the zinc and the ambient atmosphere. By doing so, the dissimilar metal reaction between the zinc in the zinc coated hardware and the copper in the ACQ treated lumber, which would normally occur in construction hardware coated by zinc alone, is substantially reduced or eliminated.

This moisture or water barrier can be applied to a zinc coated roll of coil steel before manufacture of the individual hardware articles or can be applied subsequent to manufacture or stamping of the individual hardware articles by dip coating or the like. The preferred embodiment, however, contemplates applying the moisture barrier coating to both sides of a roll of zinc coated steel via a roll coating process or the like and then forming the individual hardware pieces from the moisture barrier coated coil steel. Preferably the forming is done in a conventional manner by stamping or the like.

A variety of moisture or water barrier coatings are acceptable for use in the present invention. Preferably, however, such moisture barrier should be a material which adheres to the outer surface of a zinc coated construction hardware article despite the various bending, cutting and other steps involved in the manufacture of the hardware from the coil steel. Further, the moisture or water barrier must preferably be sufficient to substantially prevent water or moisture from contacting the zinc coating on the hardware under normal use conditions.

Various moisture barriers have been considered for use in the present invention. In the preferred embodiment, the moisture coating is an organic moisture barrier or coating selected from one or more of the 500 Series of the family of Magni coatings. These are manufactured and sold by The Magni Group, Inc. of Birmingham, Mich. More specifically, the most preferred moisture barrier is a coating manufactured by The Magni Group, Inc. and identified as Magni 599, or a variation thereof known as Magni L94. Magni L94 is an organic coating whose major chemical ingredient (in the amount of 30.0-32.0% wt.) is propylene glycol monoethyl acetate (PMA). The Magni L94 coating may be applied via roll coat or the like to a roll of coil steel or it may be applied to individual construction hardware articles after manufacture. Preferably, the Magni L94 is applied to both sides of a roll at a dry film thickness in the approximate range of 0.3 to 0.4 mil.

For many applications, the moisture barrier coating such as the Magni L94 coating adheres sufficiently to the zinc coating by itself, without further assistance. However, in other applications, adhesion of the Magni L94 to the zinc is an issue. Accordingly, a more preferred embodiment involves precoating the zinc coated steel with a pretreatment chemical or conversion coating to improve adhesion between the zinc and the moisture barrier coating. In the preferred method, this pretreatment chemical is applied by reverse roll coating to the zinc at the beginning of the coil coating process. Preferably, the pretreatment chemical is one or more of the Bonderite family of conversion coating made and sold by the Henkel Technologies division of Henkel Corporation. More specifically, possible Bonderite family of chemicals include: Bonderite 1402W, Bonderite 1455SF, Bonderite 1303 and Bonderite 1421-A. These chemicals are adhesion promoters which are preferably applied by reverse roll coating after cleaning and rinsing of the zinc coated steel and prior to oven drying. The pretreatment chemical is preferably applied at the rate of about 11 to 16 milligrams (mg) per square foot (sf).

Because any moisture barrier coating, including Magni L94 of the preferred embodiment, is susceptible to light scratching and rubbing to some extent, a dry film lube (DFL) is added or applied to the steel coil after the moisture barrier coating has been applied. Preferably, the dry film lubricant used in the preferred embodiment is Henkel Drawco DFL 767 manufactured and sold by the Henkel Technologies division of Henkel Corporation. The applied DFL serves two functions. First, as indicated above, it assists in protecting the moisture barrier coating from light scratches and rubbing. Second, it functions to lubricate the article stamping equipment. Thus, when the DFL coating is used, the normal water soluble lubricant which is typically applied to the steel to lubricate the stamping equipment can be eliminated. In the preferred method, the DFL is applied by reverse roll coating at a rate of about 150 to 250 milligrams (mg) per square foot (sf).

Accordingly, the method in accordance with the preferred embodiment of the present invention can be summarized as follows:

1. First, coil steel which has been zinc coated or galvanized on both sides with the desired zinc thickness is provided. Preferably, this coil steel comes treated with light oil to limit access to moisture and to provide a better adhesion base than steel which has been chemically treated dry. The steel also has a zinc coating preferably no greater than G90.

2. Next, unless further coating steps are to be applied at the steel provider, the coil is shipped or otherwise transferred to a precoating facility. Here the coil is unwound, cleaned and the coatings of the pretreatment chemical or conversion coating (Bonderite 1402W, 1455SF, 1303 and/or 1421-A), the moisture barrier layer (Magni 599, Magni L94 or other organic moisture barrier) and the dry film lube (Henkel Drawco DFL 767) are applied to both sides.

3. Next, the coil is slit into strips suitable for manufacture into articles of construction hardware in accordance with known procedures. Typical manufacturing procedures include stamping.

As shown in accompanying FIG. 1, the construction hardware in accordance with the present invention comprises a piece of construction hardware 10 which is coated with a protective layer 11 of zinc and which has also been provided with a moisture barrier coating 12 on top of the zinc. Preferably, the zinc is of a thickness of at least G60, more preferably G90. Preferably, the moisture barrier is selected from one of the Magni family of coatings, specifically Magni L94. A layer 14 of a chemical pretreatment or conversion coating of an adhesion promoter such as the Bonderite family of chemicals identified above is provided between the layers 10 and 12 and a layer 15 of a dry film lube such as Henkel Drawco DFL 767 is applied to the layer 12.

Although the description of the preferred embodiment is quite specific, it is contemplated that various modifications could be made without deviating from the spirit of the present invention. Accordingly, it is intended that the scope of the present invention be dictated by the appended claims rather than by a description of the preferred embodiment.

The invention claimed is:

1. A corrosion resistant article of construction hardware comprising:

a base article comprised of cold-formed steel construction hardware selected from the group consisting of hangers, connectors, straps, and tiedowns, the hardware configured to contact and connect a lumber member treated with ACQ and coated with a plurality of layers, the layers comprising:

zinc of at least G60 thickness chemically bonded to the cold-formed steel, the zinc having an activated surface treated with a light oil;

a moisture barrier coating applied to said zinc; and a lubricant coating applied to said moisture barrier coating, wherein:

the lubricant coating protects the moisture barrier from scratches and rubbing and further lubricates equipment used to stamp, bend, cut, or otherwise form the article; and the moisture barrier coating isolates the zinc from the lumber member thereby minimizing any dissimilar metal reaction between the zinc and the ACQ treatment.

2. The article of claim 1, wherein said moisture barrier coating is configured to adhere under conditions of manufacturing such as stamping, bending, and cutting.

3. The article of claim 2, wherein the moisture barrier coating is an organic coating.

4. The article of claim 3, wherein the organic coating contains between approximately 30% to approximately 32% propylene glycol monoethyl acetate.

5. The article of claim 1, further comprising a precoat between said zinc and said moisture barrier coating.

6. The article of claim 5, wherein said precoat is an adhesion promoter.

7. The article of claim 1, wherein said lubricant coating is a dry film lube.

* * * * *